United States Patent [19]

Walker et al.

[11] Patent Number: 4,515,646

[45] Date of Patent: May 7, 1985

[54] METHOD FOR APPLYING POLYURETHANE BACKING

[75] Inventors: Paul Walker, 2606 W. Lake Park, Rocky Face, Ga. 30740; Glen F. Hamrick, 3200 Summer Rd., Tunnel Hill, Ga. 30755; B. Lamar Sosebee, Resaca, Ga.

[73] Assignees: Paul Walker, Rocky Face; Glen F. Hamrick, Tunnel Hill, both of Ga.

[21] Appl. No.: 554,210

[22] Filed: Nov. 22, 1983

[51] Int. Cl.³ .............................. B05D 3/10; B05D 5/00
[52] U.S. Cl. ..................................... 156/78; 156/289; 427/244; 427/341; 427/348; 427/358; 427/359; 427/369; 427/373; 427/377
[58] Field of Search ............... 427/244, 373, 377, 348, 427/341, 358, 359, 369; 118/413, 63; 68/200, 5 C, 5 D; 428/95, 96; 156/78, 289, 79

[56] References Cited

U.S. PATENT DOCUMENTS

| | | | |
|---|---|---|---|
| 3,518,102 | 6/1970 | Mertgen et al. | 427/365 |
| 3,519,526 | 7/1970 | Carey et al. | 428/320.2 |
| 3,705,834 | 12/1972 | Terry | 427/373 |
| 3,926,700 | 12/1975 | Hopkins, Jr. et al. | 428/95 |
| 4,132,817 | 1/1979 | Tillotson | 427/244 |
| 4,171,395 | 10/1979 | Tillotson | 428/95 |
| 4,239,821 | 12/1980 | McLean et al. | 427/373 |
| 4,278,482 | 7/1981 | Poteet et al. | 156/78 |

Primary Examiner—Evan K. Lawrence
Attorney, Agent, or Firm—James B. Middleton

[57] ABSTRACT

A method for applying a blown polyurethane coating to carpeting or other sheet material. The method includes the step of adding a filler to the polyurethane components to assure that the liquid does not unduly penetrate porous goods. The mixed polyurethane components are then placed in a puddle on the sheet material and leveled to a uniform coating. Steam is passed through the sheet material and the coating to initiate the reaction of the components. The steam also adds water to the coating, so the formulation is such that additional water is needed, and the needed water is added by the steaming. After the polyurethane has completed blowing, and before the polyurethane has cured beyond its plastic state, the foam may be compressed to decrease the thickness. A second sheet of material can be placed over the polyurethane to prevent the polyurethane from adhering to the compressing roller.

17 Claims, 6 Drawing Figures

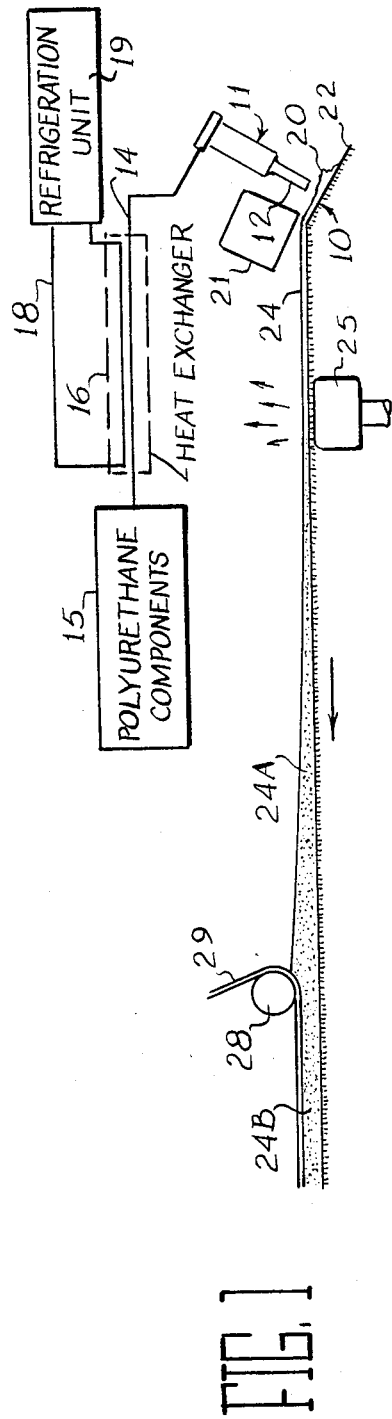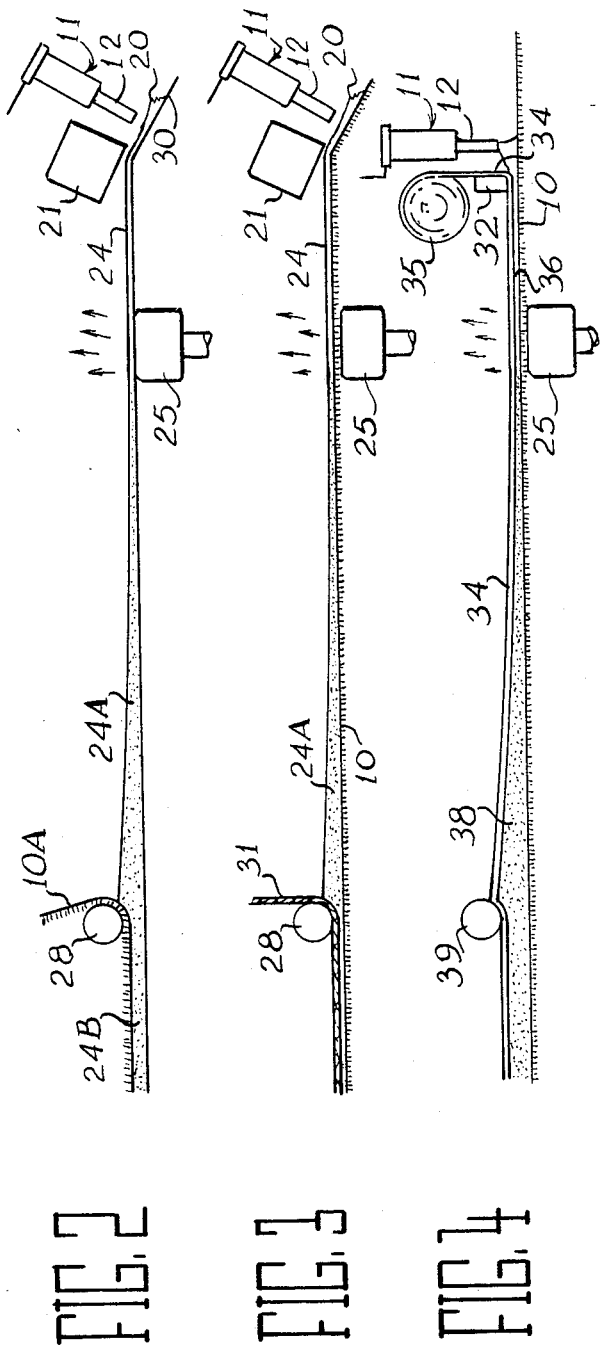

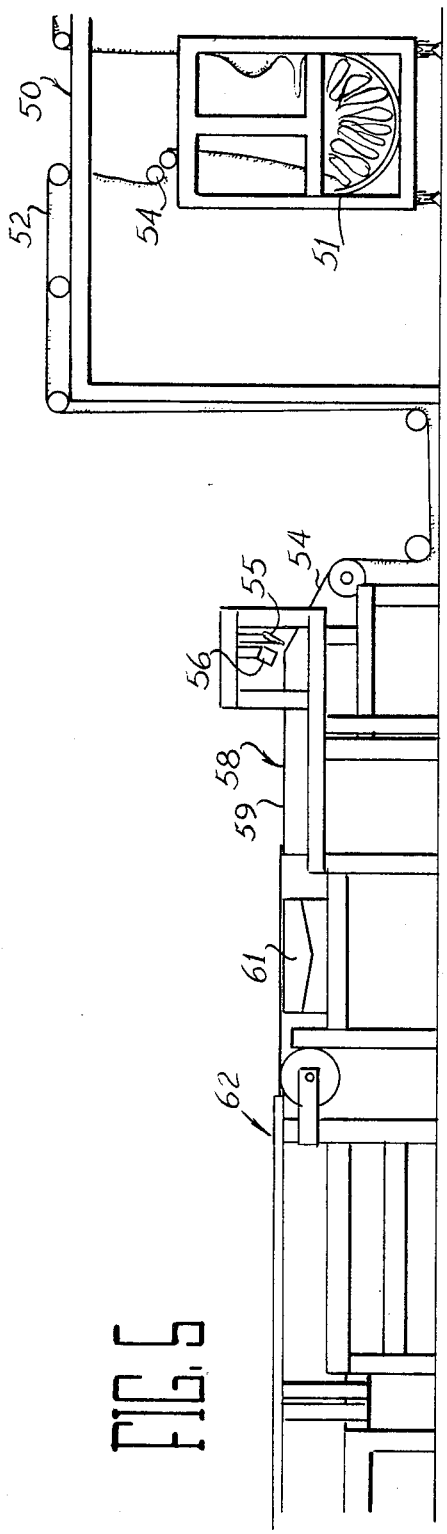
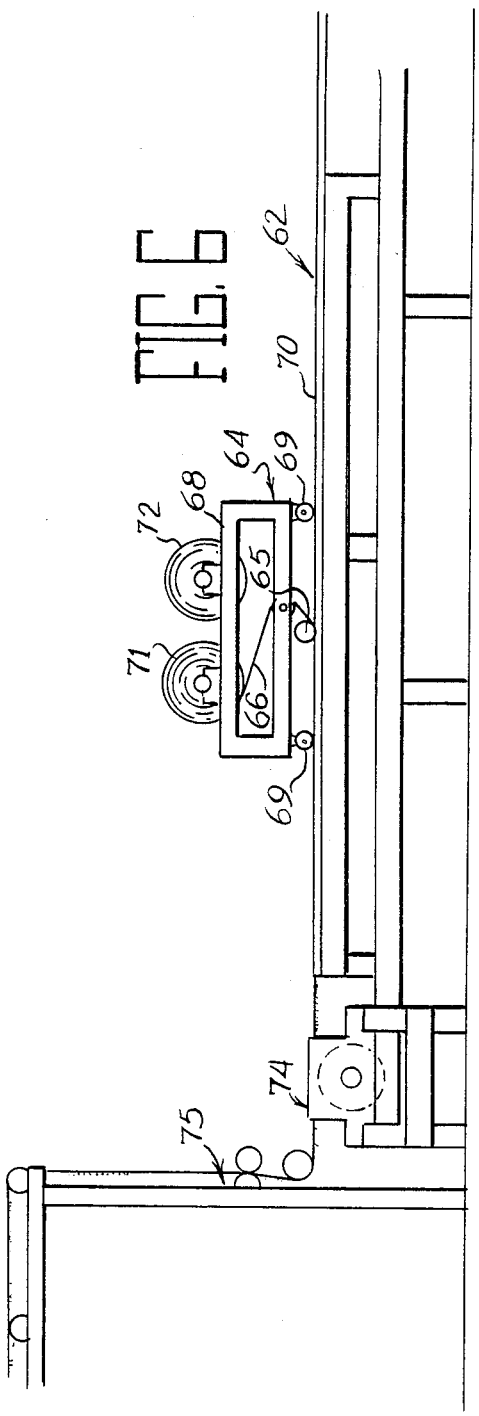

METHOD FOR APPLYING POLYURETHANE BACKING

BACKGROUND OF THE INVENTION

There have been numerous efforts to utilize a polyurethane composition in the textile industry. Especially in the tufted carpet industry, it will be recognized that it is necessary to secure the face yarns in the primary backing by means of an adhesive, and it is of course desirable to provide a cushion or padding for the carpeting.

Latex has been used extensively for securing the face yarns in the primary backing, and for adhering a secondary backing to the primary backing. While this technique has been commercially successful, the use of latex is undesirable both because of the total weight of the resulting product, and because of the energy necessary to dry the latex after application.

In many instances, a pad is fixed directly to the carpeting so the carpet can be installed without the separate installation of a pad. Again, latex has been used extensively to provide such a pad, the latex being foamed, then dispensed onto the carpet backing, doctored to a uniform thickness, then dried or cured. The curing of the foamed latex requires a large amount of energy because of the quantity of water that must be removed from the foamed latex.

To overcome the disadvantages of the latex, there have been efforts to utilize a polyurethane for the cushioned backing for carpet and the like. The difficulties with polyurethane include the fact that the components for producing a polyurethane, when placed directly on textile goods will quickly flow through the goods. Thus, if the polyurethane components are placed on the primary carpet backing, the material will flow into the face yarns of the carpet. Because of this fact, the prior art utilization of polyurethane for textile coatings have employed several different methods to apply the polyurethane to the textile goods. British Pat. No. 1,302,213 discloses the spraying of the components onto a piece of material, and allowing the components to react to form a blown polyurethane. U.S. Pat. No. 4,278,482 discloses a similar process wherein the components are sprayed onto the textile goods. The system disclosed in U.S. Pat. No. 4,132,817 includes the dispensing of the polyurethane components onto an impervious belt, allowing the components to react to form a blown polyurethane, and applying the textile material to the polyurethane while the material is blowing.

The prior art systems wherein the polyurethane components are sprayed onto a substrate have generally been found to be unacceptable because of the difficulty of obtaining uniform mixing of components in application of the components. Since the polyurethane components react with one another to produce heat, and the heat accelerates the reaction, it will be understood that a small difference in thickness of application of the components will produce a large difference in the blown polyurethane composition. A mechanical frothing of the polyurethane components is both difficult and expensive since the components must be mechanically frothed and blown, then external heat must be applied to effect a cure. The application of the components to an impervious belt requires an elaborate mechanism, and generally the use of release agents or the like so that such a process becomes quite expensive.

SUMMARY OF THE INVENTION

This invention relates generally to textile coatings, and is more particularly concerned with a method for applying a polyurethane material directly to the textile goods, and allowing the components to react on the goods.

The present invention provides a method wherein polyurethane forming components are cooled to a low temperature, then mixed and applied directly to sheet material. The puddle of liquid is leveled to yield a coating of uniform thickness, and steam is blown through the sheet material and into the coating both to provide heat for beginning reaction of the polyurethane components and for providing additional water for use in the reaction. After the components have formed the polyurethane and blowing is complete, but before the polyurethane is completely cured, the thickness of the blown layer can be changed by compressing the foam. During the compressing, either a detackifying means is used, or an additional piece of material is adhered to the surface of the polyurethane and utilized in lieu of the detackifying agent. In the event the polyurethane is to be applied to porous textile goods, the mixture of the polyurethane components is thickened by means of a filler to the point that the mixed components will not flow through the textile goods.

In the preferred embodiment of the invention, the polyurethane components including the filler are cooled, mixed together to provide a liquid mix and dispensed onto the fabric. The resulting puddle of the liquid mix is made into a uniform coating by means of an air knife, and the resulting coating is caused to react by passing steam through the fabric and the coating. The polyurethane components are mixed with less water than would normally be required for a conventional polyurethane, and the use of steam both adds the necessary water and provides the heat for causing reaction of the components. The polyurethane is allowed to complete blowing, a detackifying means is used, and the thickness of the polyurethane is changed by compressing the foam while the polyurethane is in its plastic state. The polyurethane is then allowed to cure completely.

BRIEF DESCRIPTION OF THE DRAWINGS

These and other features and advantages of the present invention will become apparent from consideration of the following specification when taken in conjunction with the accompanying drawings in which:

FIG. 1 is a schematic, side elevational view disclosing a system utilizing the present invention wherein the mixture of polyurethane components is applied directly to carpeting, and a film is used as a detackifying means;

FIG. 2 is a view similar to FIG. 1, but showing the application of the polyurethane components to a film, and applying the carpet in lieu of the detackifying means;

FIG. 3 is a view similar to FIG. 1, but illustrating the application of a secondary backing to the carpeting, and utilizing the polyurethane as an adhesive;

FIG. 4 is a view similar to FIG. 1, but showing a modified puddle leveling means; and, FIGS. 5 and 6 are side elevational views showing apparatus made in accordance with the present invention, FIG. 5 showing the intake end of the system, and FIG. 6 showing the output end of the system.

DETAILED DESCRIPTION OF THE EMBODIMENTS

Polyurethanes are well known in the art, and it will be understood that polyurethane is made by mixing a polyol and an isocyanate, generally with at least one catalyst to promote cross linking, and water. The water reacts with the isocyanate to produce carbon dioxide for foaming the mixture.

Conventionally, heating the mixture starts the reaction, and promotes the reaction through complete cure. In many urethanes, the heat is created either completely or partially through an additional catalyst; however, it will be understood that the use of a chemical catalyst to bring about the reaction means that the reaction will begin very quickly after complete mixing of the ingredients.

With the above in mind, it should be realized that the conventional urethane system is either catalyzed so that the reaction begins when the ingredients are mixed, or the reaction is caused by externally applied heat, requiring considerable energy input both to create the polymerization reaction and to cure the final product.

Looking now at the present invention, and the system disclosed in FIG. 1 of the drawings, it will be seen that there is a length of carpeting designated at 10, the carpeting 10 being face down. Means not shown in FIG. 1 will cause the carpeting 10 to extend along a given path, and it is contemplated that the initial part of the path will be simply a smooth surface over which the carpet will be slid, while the final portion of the path may be defined by a conventional tenter or the like that can hold the carpet in the predetermined condition, and cause the carpeting to move along the desired path.

It will be noted in FIG. 1 that there is a dispenser indicated at 11 for dispensing the mixed polyurethane components onto the back of the carpet 10. The dispenser is of a type well known to those skilled in the art, and includes tubing means for conducting the separate components to the dispenser 11, the components being mixed within the dispenser 11 to create a liquid mix immediately before being dispensed through the nozzle 12. Such apparatus is readily available, and those skilled in the art will understand without further description.

In FIG. 1, it will be seen that the tubing means to direct the components to the dispenser 11 is indicated at 14. Again, those skilled in the art will understand that at least two such tubes will normally be utilized, one tubing carrying the polyol while the other carries the isocyanate so mixing will not occur until the components reach the dispenser 11. For purposes of simplicity, the single line 14 is here shown. There is a source of polyurethane components indicated at 15, and this will be conventional storage tanks and the like.

In the line 14, there is a heat exchanger indicated at 16, the heat exchanger including the line 14, and a coolant line 18. The coolant line 18 is here shown as a continuous loop extending from the refrigeration unit 19. Since the reaction of the urethane components is started with heat, it will be readily understood that the reaction will start less rapidly if the components are cooled. As will be better understood hereinafter, it is important in the present invention that the reaction not begin immediately, so the polyurethane components are cooled preferably to a temperature of around 55° to 65° F. The refrigeration unit 19 may be a conventional mechanical refrigeration unit, though any other source of a cooling fluid will serve as well.

Those skilled in the art will understand that dispensers such as the dispenser 11 are generally moved back and forth across the material such as the carpet 10 while the liquid mix of the polyurethane components is dispensed through the nozzle 12 onto the back of the carpet 10. Because of this motion, it will be understood that a puddle here indicated at 20 is created on the back of the carpet 10. It should also be realized that, if the polyurethane components begin to react while in the puddle, the material will be uncontrollable so a consistent coating cannot be obtained. Because the urethane formulation in the present invention does not include a catalyst to start the reaction, and the urethane components are cooled to a temperature below the reaction temperature, the puddle remains sufficiently fluid that the materials can be manipulated as desired. In the arrangement shown in FIG. 1 of the drawings, there is an air knife 21 for skimming the puddle 20 to cause a uniform coating to remain on the carpet 10.

In this connection, it will be seen that the path of the carpet 10 includes an inclined portion 22, the polyurethane components being dispensed from the nozzle 12 on the inclined portion 22. The air knife 21 directs its "blade" of air at an angle with respect to the sloped portion 22 in order to achieve the desired coating height. It will be understood that, if the air knife 21 directed air in line with the sloped portion 22, the entire puddle may be blown down the carpet a great distance so control would be lost. The use of the sloped portion 22 with the air knife 21 directed at a different angle allows the top of the puddle to be skimmed off, leaving a uniform coating on the carpet 10.

Substantially immediately after the air knife 21 has leveled the puddle 20 to provide a uniform coating 24 on the back of the carpet 10, the path of the carpet 10 may be directed generally horizontally as is shown in FIG. 1.

An air knife is quite old in the art, and has been used in several different industrial areas so the use of an air knife is well known to those skilled in the art. It will therefore be understood that the air knife utilizes a relatively low gauge pressure, and the air knife will conventionally be supplied by means of a blower or the like rather than a compressor. As a result, the air may normally be at a relatively low temperature; otherwise, additional cooling means may be required, or desirable, to maintain the air from the air knife at a low enough temperature, again to delay the reaction of the polyurethane components.

The carpet 10, with the coating 24, will next pass over a steam box indicated generally at 25. The distance between the air knife 21 and the steam box 25 is not critical, though one would generally attempt to keep the two relatively close together simply to conserve space and assure that the coating does not begin to blow too soon.

The steam box 25 should be supplied with steam substantially at 212° F., and the steam box 25 has a perforated top surface. When the carpet 10 passes over the steam box 25, steam will pass through the carpet. Since the polyurethane coating 24 is on the back of the carpet 10, the steam will also pass through the coating 24, resulting in a complete heating throughout the thickness of the coating 24. Those skilled in the art will also understand that, since the steam is approximately at 212°, the steam will be very wet and additional water will be added to the coating 24.

Because of the foregoing facts, the polyurethane compounds directed through the tube 14 to the dispenser 11 are mixed with less water than would be utilized for a conventional polyurethane formulation. While conditions will vary considerably, the isocyanate will normally be increased by 5% to 15% to take care of the additional water added by the steam from the steam box 25. As an example, the isocyanate may be increased by approximately five parts of isocyanate for each one hundred parts polyol. Thus, it will be understood that the coating 24 will remain almost totally inactive until the coating reaches the steam box 25. Since the water reacts with the isocyanate to produce carbon dioxide for blowing the coating, and the steam provides the heat to start the reaction, there will tend to be no reaction, there will tend to be no reaction before the steam box 25, and the reaction will commence after the steam box 25. It has been found that the material begins to blow almost immediately after receiving steam from the steam box 25.

As is shown in FIG. 1 of the drawings, the coating 24 becomes a foamed coating designated at 24A after passing the steam box 25. Also, it will be seen that the thickness of the coating 24A increases in the direction of motion of the carpet indicated by the arrow 26.

Since the polyurethane is formed by the chemical reaction, those skilled in the art will understand that there must be sufficient reaction of the components to achieve the desired cross-linking to create a stable composition. Because of this fact, the reacting mixture should not be manipulated significantly until the desired polymerization and cross-linking having been accomplished. It will be understood, however, that the material remains in a plastic state for a short time after the reaction is complete. While the material is in this plastic state, the polyurethane is very adhesive, to the point that almost anything that touches the surface of the material will be adhered thereto. Nevertheless, it is while the polyurethane is in the plastic condition that changing the thickness by compression or the like must take place, or that texturing of the rear surface etc. must take place. As a result, some detackifying means must be utilized in mechanical handling of the polyurethane.

In FIG. 1 of the drawings, there is a compression roll designated at 28, the roll 28 being placed above the path of the carpet 10 so the roll 28 will compress the coating 24A to the desired thickness to provide the final coating designated at 24B. The prior art teaches the use of a spray of water on the surface of the coating 24A as a detackifying agent, and water will work quite well in the present process though the time of application of water is critical. The prior art also teaches the use of powdered or granular substances, and any of these would also be operable in the present process. The preferred embodiment for the present invention is the use of a thin film here designated at 29.

While virtually any film may be utilized, a thin polyethylene film is quite inexpensive and works very well. A one mil thickness of polyethylene has been found to operate extremely well, though thinner films will be acceptable so long as the film is strong enough to retain its integrity to prevent the coating 24A from adhering to the roll 28. Also, thicker films can be used, but thick films may be strong enough to retain wrinkles and the like and cause an undesirable pattern on the coating 24B.

When polyethylene films are used as a detackifying means as discussed in connection with FIG. 1, the coating 24B can be completely cured, and the film 29 can be removed therefrom. Obviously, a woven film or the like may be sufficiently married to the coating that it could not be removed. Those skilled in the art will readily understand that the film 29 can be selected to achieve the desired end result.

Looking now at FIG. 2 of the drawings, the dispenser 11 with the nozzle 12 are the same as in FIG. 1. and there is a puddle 20 with an air knife 21 for leveling the puddle 20 into a uniform coating 24. In FIG. 2 of the drawings, however, the material on which the polyurethane components are dispensed is not a carpet, but may be any one of numerous substrates. The substrate in FIG. 2 is designated at 30, and may be a perforate polyethylene film, or a woven or nonwoven fabric. It will be understood that the substrate 30 must be pervious to steam, because the system is the same wherein the substrate 30 with the coating 24 passes over the steam box 25, and steam passes therethrough to activate the polyurethane components. When the coating 24 passes the steam box 25, the components react to create the coating 24A, and the coating 24A is regauged by a roll 28.

It will now be seen that the arrangement in FIG. 2 is substantially the arrangement of FIG. 1 inverted. Whereas FIG. 1 shows the urethane components deposited onto the carpet 10 with a film 29 placed on the back, against the coating 24A, FIG. 2 discloses the depositing of the polyurethane components onto a film 30, and carpet indicated at 10A is shown as passing around the compression roll 28 so the coating 24A is compressed while the carpet 10A is applied thereto. The coating 24B is therefore substantially the same as the coating 24B in FIG. 1, but inverted. The only structural difference may be that the substrate 30 must be pervious to steam, while the film 29 may be impervious.

Looking now at FIG. 3 of the drawings, the arrangement is again the same as that shown in FIG. 1 of the drawings, and the various reference numerals are the same since the parts are the same. The only difference between the arrangement shown in FIG. 3 and that shown in FIG. 1 of the drawings is that the compression roll 28 is placed very close to the carpeting 10, and the detackifying means is indicated at 31, and comprises, for example, a secondary jute backing to be adhered to the carpet 10.

The arrangement shown in FIG. 3 of the drawings is highly desirable because the urethane will intimately saturate substantially each fiber of the back stitch of the carpeting 10, so the polyurethane comprises a very effective means for locking in the face yarns of the carpet 10. Also, the steam box 25 is the only energy input, and the jute backing 31 can be adhered to the carpet 10 to provide a light weight yet high quality product.

Attention is next directed to FIG. 4 of the drawings. Again, the dispenser 11 is the same, with the spout 12 for dispensing the polyurethane components onto the carpet indicated at 10. The different in the embodiment shown in FIG. 4 is that, rather than the air knife 21, there is a doctor blade designated at 32. Those skilled in the art will realize that a conventional doctor blade would very quickly accumulate a quantity of the polyurethane components, and the components would react so the system would be completely inoperative. To resolve this problem, there is a film indicated at 34 passing over the doctor blade 32. The film 34 will be at least as wide as the doctor blade 32 so the entire doctor blade 32 will be covered with the film. As shown in FIG. 4, the film 34 is delivered from a roll 35, the film 34 passing downwardly around the doctor blade 32, beneath the doctor blade 32 and to the upper surface of the coating indicated at 36. With this arrangement, there will always be a clean piece of film 34 on the working side of the doctor blade 32 to prevent an accumulation of chemicals. It will also be understood that the film 34 both maintains the doctor blade clean and provides an upper, detackifying film for the coating 36.

The arrangement shown in FIG. 4 is substantially the same process as that disclosed in FIG. 1 of the drawings, and this required use of the steam box 25 for passing steam through the carpet 10, and the coating 36. To be able to pass steam through the coating 36, one must obviously be able to pass steam through the film 34. For this reason, the film 34 will necessarily be a perforate film, though many forms of perforate film may be utilized. As discussed hereinbefore, it will be understood that a woven fabric may be used, a nonwoven fabric may be used, or a plastic film having a plurality of perforations therein may be used.

After the coating 36 passes the steam box 25, the chemicals react and start to blow to cause an increase in thickness in the coating as indicated at 38. Since the blowing of the chemicals releases gas, it is again necessary that the film 34 be perforate to allow the escape of gas.

With the arrangement shown in FIG. 4, it will be readily understood that the compression of the coating by the roll 39 does not require the application of an additional detackifier because the film 34 remains in place, and will prevent the polyurethane material from sticking to the roll 39.

Attention is next directed to FIGS. 5 and 6 of the drawings, these two figures constituting one complete apparatus made in accordance with the present invention. FIG. 5 shows the beginning of the process, and FIG. 6 shows the end of the process.

In more detail, FIG. 5 illustrates an unrolling section generally indicated at 50. Those skilled in the art will understand that rolls of tufted carpet will be transported to the unrolling section 50, and the carpet will be unrolled and placed into an accumulator such as the J-box 51. From the J-box 51, the carpet indicated at 52 is pulled by feed rollers 54 to leave the J-box 51. The carpet 52 is then fed around the frame 50 by appropriate rollers, and the carpet 52 is ultimately received on the sloped portion 54 of the coating apparatus.

It will be remembered from the foregoing discussion that the present invention includes a sloped portion as the initial ramp, and the material is then carried substantially horizontally. In FIG. 5 it will be seen that the sloped portion 54 has the urethane component dispenser indicated at 55 disposed substantially at the upper edge of the sloped portion 54. Just behind the dispenser 55, the air knife 56 is mounted, the air knife 56 acting as previously described to reduce the puddle to a uniform coating of material on the back of the carpet 52.

It should be observed that the forward section of the coating apparatus, generally designated at 58, does not utilize a powered conveyor. The sloped portion 54 and the subsequent horizontal portion 59 will be simply a smooth surface, and it will be understood that the face yarns of the carpet will drag over the smooth surface so the carpet will move quite easily.

Immediately following the section 58, there is the section 60 which contains the steam box 61. In accordance with the previous discussion, those skilled in the art will understand that the carpeting moves from the section 58 where the back of the goods receive a coating; then, the goods are moved into the section 60 where they pass across the steam box 61. Steam from the steam box 61 will heat the coating and add water to produce the reaction for blowing the polyurethane.

Following the section 60, there is designated a section 62. Though the section 62 may take many forms, the section 62 here shown is a conventional tenter. The tenter is designed to hold carpeting by the edges and to move the carpeting along the path. As a result, the tenter works quite well, and can receive the initial leading edge of the carpet and pull the material through the first section 58 and second section 60. As a result, no additional conveyor means is required at the entrance end of the apparatus.

Looking now at FIG. 6 of the drawings, the section of the apparatus is again designated at 62 since this is a continuation of the tenter discussed in connection with FIG. 5. It will be understood that the coating has been placed on the material, the coating has blown, and it is the appropriate location to change the thickness of the foam if desired. For this purpose there is a compression roll assembly generally designated at 64.

Those skilled in the art will understand that, in creating a polyurethane sheet, when the blowing of the polyurethane is completed, the surface of the polyurethane is highly adhesive, and the polyurethane is in a plastic state. It is while the polyurethane remains in a plastic state that compression must be accomplished. After the polyurethane has cured, the material has become very resilient, and has sufficient elasticity that the material will return to its original shape after deformation.

If the polyurethane sheet is distorted, covered, or otherwise manipulated during the blowing period, it is quite possible that the final quality of material will be lessened, and gas bubbles may be entrapped causing a distortion and weakening the entire substance. Thus, it is important to compress the polyurethane at the proper time, especially when an imperforate sheet is to be used as a detackifying means.

In view of the foregoing, it will be understood that the compression roll designated at 65 needs to be adjustable so the detackifying film 66 can be placed against the polyurethane at the optimum time. It will here be seen that the assembly 64 comprises a frame 68 mounted on wheels 69, the wheels 69 being adapted to roll on a track 70. Appropriate locking means, not here illustrated, will be provided to prevent inadvertent movement of the assembly 64 once the compression roll 65 has been placed in the desired location.

The assembly 64, as here shown, includes a pair of supply rolls 71 and 72 for supplying the film 66.

Those skilled in the art will realize that the track 70 is mounted on the upper frame of a conventional tenter 62, and the total combination should be understood by those skilled in the art from the above discussion.

After the material, with the polyurethane applied, passes the assembly 64 where the thickness of the material is changed, and a film is applied if desired, the carpet for the like continues through the tenter 62, passing the tenter drive means 74 at the discharge end of the tenter. When the goods leave the tenter, the polyurethane will be substantially cured. Even if the polyurethane is not completely cured, the cure will be sufficient that the material can be handled without damaging the polyurethane foam. Thus, the material is lifted from the tenter by a conventional frame designated at 75 and directed to a roll-up machine.

From the foregoing description, it should now be understood by those skilled in the art that the present invention provides a very simple process for applying a polyurethane coating or padding to sheet material. The polyurethane may take the form of a padding on the back of carpeting or the like, and may be used primarily or exclusively as an adhesive, as in the adhering of a secondary backing to a primary backing in carpeting. It will be understood that one may allow the polyurethane to blow, and to retain some of the thickness so some cushioning is provided in conjunction with the adhesion.

The foregoing description has included the use of a filler in the liquid mix to prevent the material from passing through carpeting when the coating is applied to tufted carpeting. Though the filler is necessary on completely uncoated carpeting, it has been found that carpeting having a pre-coat does not require the filler. It will be understood that carpeting is sometimes pre-coated with latex to secure the face yarns, and later coated further with either a foamed material or a secondary backing. Such a pre-coat will prevent the liquid mix from flowing into the face yarns, but steam easily passes through the coated goods. As a result, pre-coated carpeting works well in the present system.

It will also be recognized that the face yarns in carpeting are preferably subjected to steaming to bloom the fibers and give additional bulk to the yarns. Using the method of the present invention, the steam is primarily for initiating the reaction of the polyurethane, but the carpet yarns are bloomed also since the yarns are contacted with moist steam.

Those skilled in the art will devise many specific formulations for polyurethane that will operate satisfactorily, and will find numerous fillers to give the liquid mix sufficient viscosity to prevent the polyurethane from passing through textile goods. The filler may be added in the amount of approximately one to approximately two hundred fifty parts filler for each one hundred parts polyol.

By way of example, it has been found that calcium carbonate ($Ca_2CO_3$) words quite well as a filler, and is desirable because of the very low cost of the material. Other conventional fillers will also operate satisfactorily, such as barium sulfate, alumina trihydrate, clay and starch. It will be understood that the starches may react with components of the polyurethane, so the resulting substances will have to be considered.

It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as defined in the appended claims.

We claim:

1. A method for forming a blown polyurethane coating on porous sheet material, said polyurethane coating being formed by reaction of urethane forming components including at least a polyol, an isocyanate and water, said reaction requiring heat for initiation, said method including the steps of cooling said components to a temperature substantially below the temperature for initiation of the reaction, preparing a formulation of said urethane forming components having an excess of the isocyanate relative to the water compared to the desired coating formulation to provide a liquid mix, placing a quantity of said liquid mix on said porous sheet material in a puddle, leveling said puddle to provide a uniform coating of said liquid mix on said porous sheet material, passing steam through said sheet material and into said uniform coating for adding water to said liquid mix for reaction with said excess of isocyanate and for heating said liquid mix to start said reaction.

2. A method as claimed in claim 1, and further including the steps of applying a detackifying means to the surface of the polyurethane, and compressing the polyurethane to reduce the thickness of the polyurethane, the application of detackifying means and the compressing being carried out after the liquid mix has completed blowing and before the polyurethane has cured beyond its plastic state.

3. A method as claimed in claim 1, said sheet material comprising porous textile goods, said method further including the step of adding a filler to said formulation for thickening said liquid mix for causing said liquid mix to remain substantially on the surface of said porous textile goods.

4. A method as claimed in claim 3, and further including the steps of applying a detackifying means to the surface of the polyurethane, and compressing the polyurethane to reduce the thickness of the polyurethane, the application of detackifying means and the compressing being carried out after the liquid mix has completed blowing and before the polyurethane has cured beyond its plastic state.

5. A method as claimed in claim 4, said porous textile goods consisting of tufted carpeting comprising a primary backing and face yarns tufted thereinto, the step of adding a filler to said formulation including adding sufficient filler to prevent said liquid mix from passing through said primary backing and into said face yarns.

6. A method as claimed in claim 5, said steps of applying a detackifying means and compressing the polyurethane being performed generally simultaneously by passing a second sheet of material over a compression roll so that said second sheet of material adheres to the polyurethane and prevents adherence of said compression roll to the polyurethane.

7. A method as claimed in claim 6, said second sheet of material consisting of polyethylene film.

8. A method as claimed in claim 6, said second sheet of material consisting of a textile fabric.

9. A method as claimed in claim 6, said second sheet of material consisting of a secondary backing for said tufted carpeting, and further including the step of compressing the polyurethane to the extent that said secondary backing is substantially adhered to said primary backing.

10. A method as claimed in claim 1, the step of leveling said puddle including the steps of placing a doctor blade above said sheet material for leveling said puddle, and passing a sheet of perforate material over said doctor blade.

11. A method as claimed in claim 1, and further including the steps of directing said sheet material along a path having an upwardly inclined portion, said puddle being formed on said upwardly inclined portion, said step of leveling said puddle being carried out by using an air knife with the blade directed above said puddle at an angle with respect to said upwardly inclined portion.

12. A method as claimed in claim 2, said detackifying means consisting of tufted carpeting.

13. A method as claimed in claim 1, said excess of isocyanate consisting of approximately five parts of isocyanate for each one hundred parts of polyol.

14. A method as claimed in claim 1, said excess of isocyanate consisting of from approximately 5% to approximately 15% increase over said desired formulation.

15. A method as claimed in claim 3, wherein the step of adding a filler to said formulation includes adding between approximately one and approximately two hundred fifty parts filler for each one hundred parts polyol.

16. A method as claimed in claim 15, wherein said filler is selected from the group consisting of barium sulphate, calcium carbonate, alumina trihydrate, clay and starch.

17. A method as claimed in claim 15 wherein said filler consists of calcium carbonate.

* * * * *